(12) United States Patent
Yago (10) Patent No.: US 11,019,234 B2
(45) Date of Patent: May 25, 2021

(54) IMAGE FORMING SYSTEM WHICH CALCULATES AN IMAGE CORRECTION VALUE ACCORDING TO SHRINKAGE INFORMATION, IMAGE FORMING SYSTEM CONTROL METHOD, AND NON-TRANSITORY COMPUTER-READABLE RECORDING MEDIUM STORING A PROGRAM

(71) Applicant: KONICA MINOLTA, INC., Tokyo (JP)

(72) Inventor: Hiroaki Yago, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/744,354

(22) Filed: Jan. 16, 2020

(65) Prior Publication Data

US 2020/0280652 A1    Sep. 3, 2020

(30) Foreign Application Priority Data

Feb. 28, 2019  (JP) .............................. JP2019-035153

(51) Int. Cl.
*H04N 1/387* (2006.01)
*G03G 15/00* (2006.01)

(52) U.S. Cl.
CPC ......... *H04N 1/387* (2013.01); *G03G 15/6505* (2013.01)

(58) Field of Classification Search
None
See application file for complete search history.

(56) References Cited

U.S. PATENT DOCUMENTS

| 2007/0097203 | A1* | 5/2007 | Yamada ............... G03G 15/043 347/261 |
| 2009/0092279 | A1* | 4/2009 | Tabata .................. G06K 9/036 382/100 |
| 2017/0255850 | A1* | 9/2017 | Furukawa ............. G06K 15/16 |
| 2018/0071938 | A1* | 3/2018 | Namba .................... B26D 5/30 |

FOREIGN PATENT DOCUMENTS

JP        2018026758 A    2/2018

OTHER PUBLICATIONS

English Translation of Japanese Application 2016-158765, corresponding to Japanese Application Publication 2018-026758 (Furukawa). (Year: 2016).*

* cited by examiner

Primary Examiner — Thomas D Lee
(74) Attorney, Agent, or Firm — Buchanan Ingersoll & Rooney PC (57) ABSTRACT

An image forming system which, even when overprinting is made on a sheet processed by an external device, prevents misregistration of the image formed on the sheet, and a control method for the image forming system, and a non-transitory computer-readable recording medium storing a program. The image forming system includes an image forming device, an image reader, an arithmetic processor, and a controller. The arithmetic processor calculates the information on shrinkage which occurs in the sheet when the sheet is subjected to a treatment process by the external device, as external shrinkage information. The controller calculates an image correction value according to the external shrinkage information. The image forming device forms an image according to the image correction value when forming the image on the processed sheet.

13 Claims, 10 Drawing Sheets

FIG. 8A FIRST MISREGISTRATION

FIG. 8B OVERPRINTING

FIG. 8C EXPECTED OVERPRINTED IMAGE

FIG. 9

IMAGE FORMING SYSTEM WHICH CALCULATES AN IMAGE CORRECTION VALUE ACCORDING TO SHRINKAGE INFORMATION, IMAGE FORMING SYSTEM CONTROL METHOD, AND NON-TRANSITORY COMPUTER-READABLE RECORDING MEDIUM STORING A PROGRAM

CROSS-REFERENCE TO RELATED APPLICATIONS

The entire disclosure of Japanese Patent Application No. 2019-35153, filed on Feb. 28, 2019, is incorporated herein by reference in its entirety.

BACKGROUND

Technological Field

The present invention relates to an image forming system which forms an image on a sheet, an image forming system control method, and a non-transitory computer-readable recording medium storing a program.

Description of the Related Art

In the recent years, as one of the jobs performed by an image forming system, overprinting has been made in which a sheet with an image or a text formed thereon is again made to pass through an image forming device to form another image on the sheet. As the sheet passes through the image forming device, the sheet is heated by the fixing section of the image forming device or the like and thus the moisture contained in the sheet evaporates, causing the sheet to shrink. When an additional image is formed on a shrunken sheet as in the overprinting process, misregistration may occur in the formed image due to the shrinkage.

In order to solve the problem of such misregistration due to shrinkage, for example, Patent Literature 1 (JP-A-2018-26758) proposes the following technique. Patent Literature 1 describes the technique that controls the underlying image and overlying image to be printed in a manner to link them to each other and counts and stores the number of times of passage of the recording sheet through the fixing device at the time of printing the underlying image. In the technique described in Patent Literature 1, when a recording sheet with an underlying image printed thereon is placed in the paper feed tray by the user and it is supplied to print an overlying image on it, the overlying image is printed in reduced size with the reduction ratio corresponding to the number of times of passage of the sheet through the fixing device for the underlying image.

CITATION LIST

Patent Literature

Patent Literature 1: JP-A-2018-26758

SUMMARY

In addition, some of the recent image forming systems perform an overprinting job to print an image on a sheet subjected to a treatment process by an external device installed separately from an image forming device, such as stamping or varnish-coating. The treatment process by the external device also causes shrinkage of the sheet. The technique described in Patent Literature 1, however, has a problem that it does not take into consideration the shrinkage ratio or the amount of shrinkage of the sheet as caused by the external device and thus image misregistration may occur in overprinting.

The present invention has been made in view of the above problem and has an object to provide an image forming system which prevents misregistration of a formed image even when overprinting is made on a sheet processed by an external device, a method for controlling the image forming system, and a non-transitory computer-readable recording medium storing a program.

In order to solve the above problem and achieve the abovementioned object, according to an aspect of the present invention, an image forming system reflecting one aspect of the present invention comprises: an image forming device which forms an image on a sheet; and an image reader which reads the image formed on the sheet. The image forming system further includes an arithmetic processor and a controller. The arithmetic processor calculates the information on shrinkage which occurs in the sheet when the sheet is subjected to a treatment process by an external device installed separately from the image forming device, as external shrinkage information. The controller calculates an image correction value according to the external shrinkage information calculated by the arithmetic processor. The image forming device forms the image according to the image correction value when forming the image on the processed sheet.

According to another aspect of the present invention, a method for controlling the image forming system includes the following steps (1) to (4):

(1) causing an image forming device to form an image on a sheet;
(2) causing an image reader to read the image formed on the sheet;
(3) causing an arithmetic processor to calculate information on shrinkage which occurs in the sheet when the sheet is subjected to a treatment process by an external device installed separately from the image forming device, according to read image data, as external shrinkage information; and
(4) causing a controller to calculate an image correction value according to the external shrinkage information.

The image forming device forms the image according to the image correction value when forming the image on the processed sheet.

According to a further aspect of the present invention, a non-transitory computer-readable recording medium storing a program causes a computer to perform:

causing an image forming device to form an image on a sheet;
causing an image reader to read the image formed on the sheet;
causing an arithmetic processor to calculate information on shrinkage which occurs in the sheet when the sheet is subjected to a treatment process by an external device installed separately from the image forming device, according to image data read by the image reader, as external shrinkage information;
causing a controller to calculate an image correction value according to the external shrinkage information calculated by the arithmetic processor; and
causing the image forming device to form the image according to the image correction value when forming the image on the processed sheet.

BRIEF DESCRIPTION OF THE DRAWINGS

The advantages and features provided by embodiments of the invention will become more fully understood from the detailed description given hereinbelow and the appended drawings which are given by way of illustration only, and thus are not intended as a definition of the limits of the present invention:

FIGS. 3A and 3B are explanatory diagrams which show the amount of shrinkage of a sheet in the image forming system according to the first embodiment of the present invention, in which FIG. 3A shows the sheet with a first image and FIG. 3B shows the sheet with a second image;

FIGS. 4A to 4C are explanatory diagrams which show the amount of shrinkage of the sheet as caused by an image forming device and an external device in the image forming system according to the first embodiment of the present invention, in which FIG. 4A shows the sheet with a first image, FIG. 4B shows the processed sheet, and FIG. 4C shows the sheet with a second image;

FIGS. 7A to 7C are explanatory diagrams which show the comparison between the shrunken sheet and the master image in the image forming system according to the first embodiment of the present invention, in which FIG. 7A shows the sheet with a first image, FIG. 7B shows the sheet with a second image, and FIG. 7C shows the master image;

FIGS. 8A to 8C are explanatory diagram which show the comparison between the sheet with misregistration and the master image in the image forming system according to the first embodiment of the present invention, in which FIG. 8A shows the sheet with a first image, FIG. 8B shows the sheet with a second image, and FIG. 8C shows the master image;

DETAILED DESCRIPTION OF EMBODIMENTS

Hereinafter, an image forming system, a control method and a non-transitory computer-readable recording medium storing a program according to embodiments of the present invention will be described with reference to FIGS. 1 to 10. In the drawings, the same elements are designated by the same reference signs. However, the scope of the invention is not limited to the disclosed embodiments.

1. First Embodiment

1-1 Configuration of the Image Forming System

Figure 1:
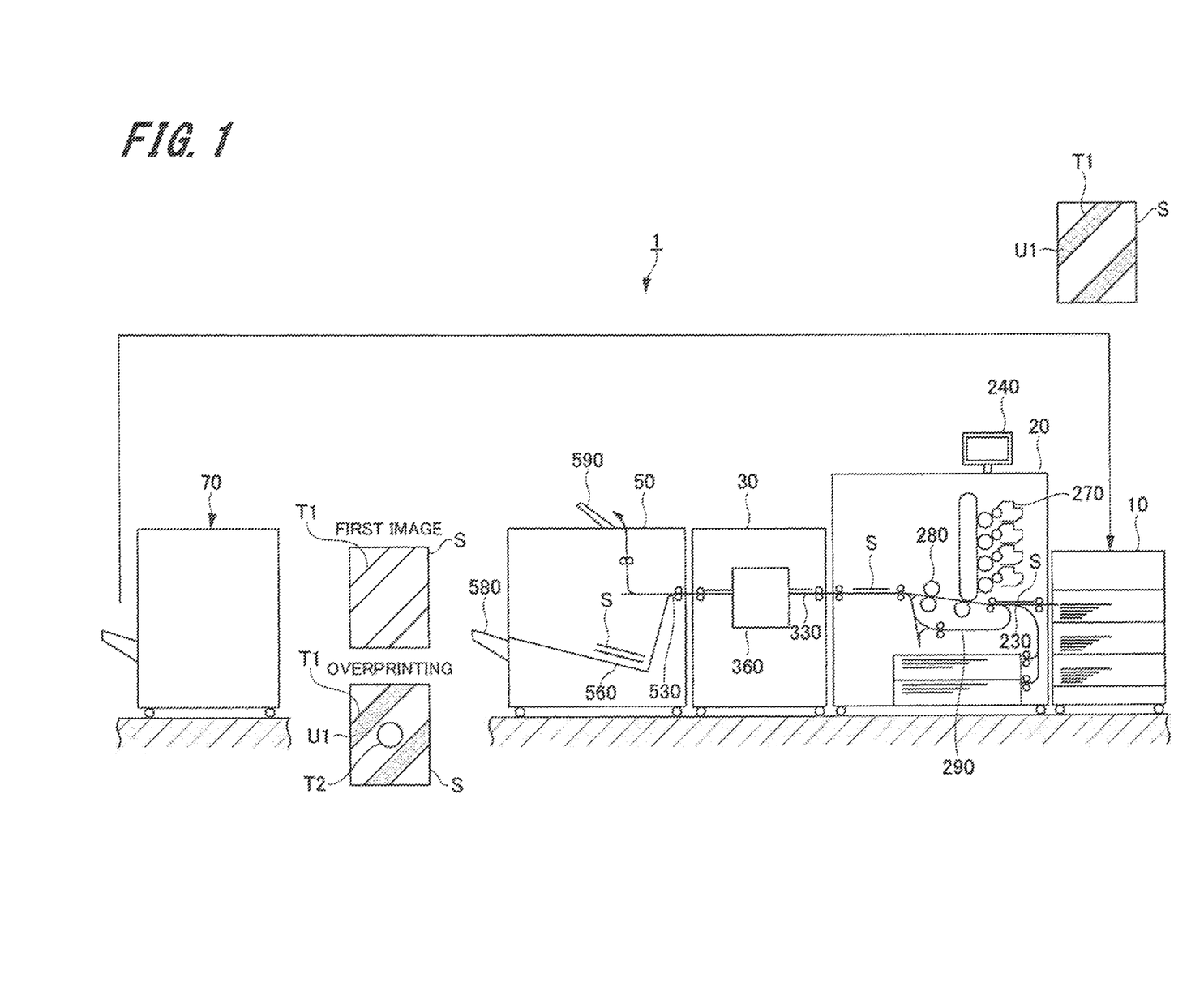
FIG. 1 is a schematic diagram which shows the general configuration of an image forming system according to a first embodiment of the present invention.

First, the general configuration of an image forming system according to a first embodiment of the present invention (hereinafter called "the present embodiment") will be described. FIG. 1 is a schematic configuration diagram of the image forming system according to the present embodiment.

As shown in FIG. 1, an image forming system 1 includes a large-capacity paper feed unit 10 for supplying sheets S, an image forming device 20, an image reader 30, and a sheet stacker 50. The large-capacity paper feed unit 10, the image forming device 20, the image reader 30, and the sheet stacker 50 are connected to a network such as a LAN and connected to each other through the network. In the image forming system 1, the large-capacity paper feed unit 10, the image forming device 20, the image reader 30, and the sheet stacker 50 are arranged in the order of mention from upstream of the transportation path for sheets S and connected in series.

The sheet S on which a first image T1 has been formed by the image forming system 1 is transported to an external device 70 installed separately from the image forming device and the external device 70 performs a given treatment process U1 to heat the sheet S. The sheet S subjected to the treatment process U1 by the external device 70 is again transported to the image forming system 1 and then a second image forming process, so-called overprinting, is performed by the image forming system 1. As a result, a second image T2 is formed on the sheet S. Hereinafter, the first image T1 is called unprocessed image T1 and the second image T2 is called overprinted image T2.

The treatment process U1 performed by the external device 70 is, for example, stamping, varnish coating, or lame (metallic fiber) coating which includes heat application to the sheet S. Therefore, also in the treatment process U1 by the external device 70, the moisture contained in the sheet S evaporates and the sheet S shrinks. The external device 70 performs one of the stamping, varnish coating and lame coating processes or a combination of these processes for the sheet S.

The large-capacity paper feed unit 10 is located on the most upstream side of the image forming system 1. The large-capacity paper feed unit 10 includes a plurality of paper feed trays and can house a large volume of sheets. The large-capacity paper feed unit 10 supplies the sheet S housed in a paper feed tray to the image forming device 20 through a paper conveyor 130 (see FIG. 2).

The image forming device 20 forms an image on the supplied sheet S according to output job information and image data. The image forming device 20 adopts an electrophotographic method to form an image on a sheet S. The image forming device 20 includes a paper conveyor 230, an operation display panel 240, an image forming section 270, a fixing section 280, and an inversion conveyor 290.

The operation display panel 240 representing a notifying section is located over the housing of the image forming device 20. The operation display panel 240 includes a display panel and a touch panel (operation section) which are placed one upon the other so as to enable operation by the user and display of information.

The paper conveyor 230 transports the sheet S supplied from the large-capacity paper feed unit 10 to the image forming section 270, the fixing section 280, the inversion conveyor 290, and the sheet stacker 50 which will be described later.

The image forming section 270 includes, for example, image forming units for a plurality of colors (cyan, magenta, yellow, black, etc.) and can form a color toner image on a sheet. The fixing section 280 to which the sheet with the toner image formed thereon is transported is located downstream of the image forming section 270 in the sheet transportation direction.

The fixing section 280 fixes the transferred toner image on the sheet S by pressurizing and heating the transported sheet S. The sheet S subjected to the fixing process by the fixing section 280 is transported to the inversion conveyor 290 or the image reader 30 by the paper conveyor 230.

The inversion conveyor 290 includes an inversion section which inverts the sheet S. The sheet S inverted upside down or back and forth by the inversion section is made to pass through the inversion conveyor 290 and transported to the upstream side of the image forming section 270 or the downstream side of the fixing section 280.

The image reader 30 is a device which reads the image formed on the sheet S transported from the image forming device 20. The image reader 30 includes a paper conveyor 330 for transporting sheets and an image reading section 360 for reading an image. The image reading section 360 lies above and below the paper conveyor 330. The image reading section 360 reads the information (image) formed on the sheet S by optically scanning the sheet S transported by the paper conveyor 330 and generates read image data.

The sheet stacker 50 includes a paper conveyor 530 for transporting sheets S, a stacking section 560 where sheets S are stacked, a post-processing section 570 (see FIG. 2), a delivery tray 580, and a sub tray 590. The paper conveyor 530 transports the sheet S transported from the image forming device 20 to the stacking section 560 or the sub tray 590.

The post-processing section 570 performs post-processing tasks such as stapling and punching for the sheets S stacked in the stacking section 560. The sheet S transported from the stacking section 560 is delivered to the delivery tray 580. The sheet S transported by the paper conveyor 530 is delivered to the sub tray 590. The sheet S delivered to the delivery tray 580 or the sub tray 590 is carried to the external device 70 installed outside the image forming system 1 by the user.

1-2 Hardware Configurations of the Various Devices

Next, the hardware configurations of the various devices will be described referring to FIG. 2.

Figure 2:
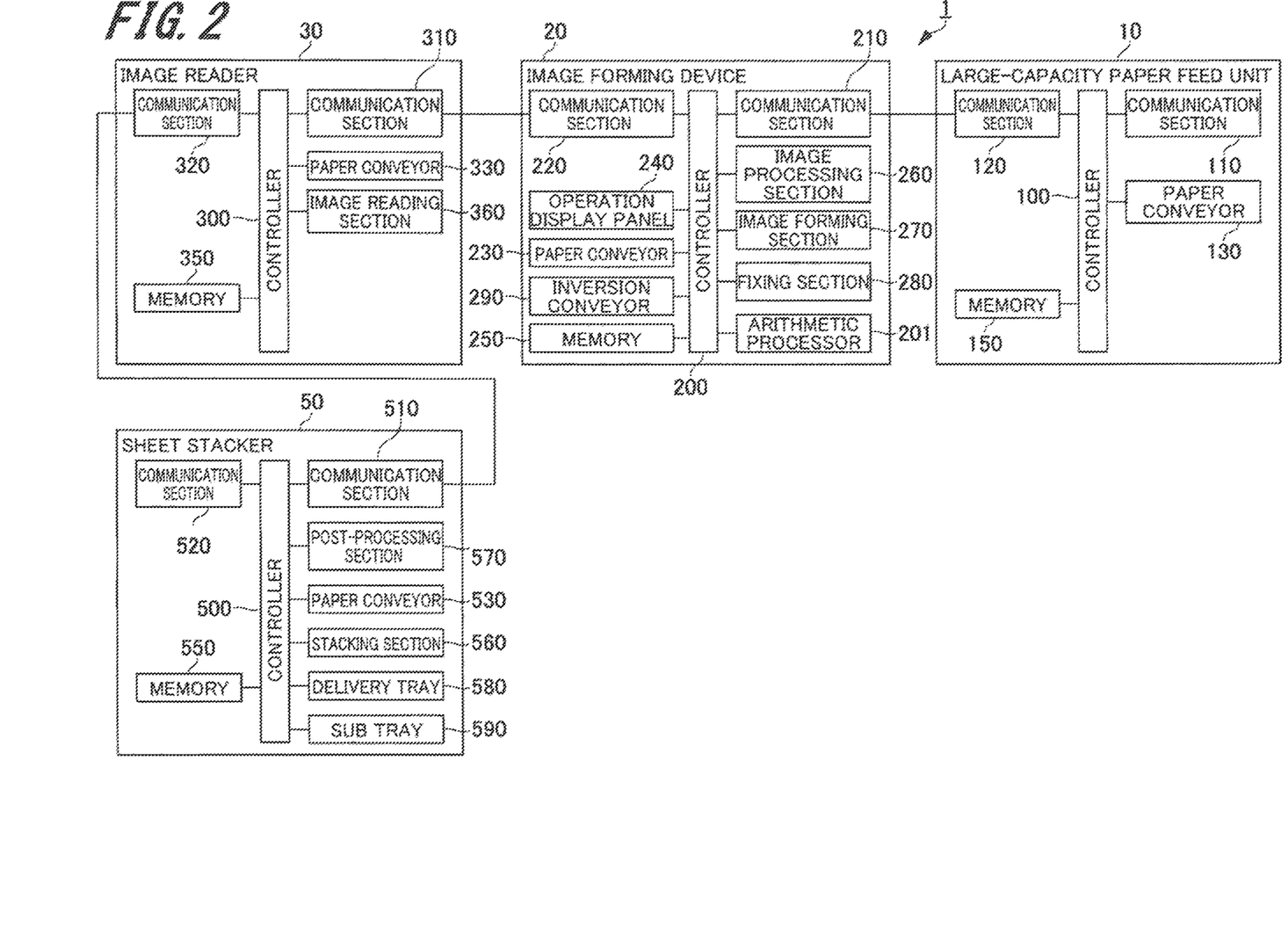
FIG. 2 is a block diagram which shows the hardware configuration of the image forming system according to the first embodiment of the present invention.

FIG. 2 is a block diagram which shows the hardware configurations of the various devices of the image forming system.

First, the hardware configuration of the large-capacity paper feed unit 10 will be described.

As shown in FIG. 2, the large-capacity paper feed unit 10 includes a controller 100, communication sections 110 and 120, the paper conveyor 130, and a memory 150.

The controller 100 has, for example, a CPU (Central Processing Unit). The controller 100 is connected to the communication sections 110 and 120, the paper conveyor 130, and the memory 150 through a system bus to control the entire large-capacity paper feed unit 10.

The memory 150 is a volatile memory such as a RAM or a large-capacity nonvolatile memory. The memory 150 stores the program to be executed by the controller 100 or the like and is used as a working area for the controller 100.

The communication section 110 performs transmission and reception of data with an external device (a client terminal, a management device server, a mobile terminal, etc.) of the image forming system 1. The communication section 120 performs transmission and reception of data with a communication section 210 of the image forming device 20.

Next, the hardware configuration of the image forming device 20 will be described.

The image forming device 20 includes a controller 200, the communication section 210, the paper conveyor 230, the operation display panel 240, a memory 250, an image processing section 260, the image forming section 270, the fixing section 280, and the inversion conveyor 290. The image forming device 20 further includes an arithmetic processor 201.

The controller 200 has, for example, a CPU (Central Processing Unit). The controller 200 is connected to the arithmetic processor 201, the communication section 210, the paper conveyor 230, the operation display panel 240, the memory 250, the image processing section 260, the image forming section 270, the fixing section 280, and the inversion conveyor 290 through the system bus to control the entire image forming device 20. Also, the controller 200 controls the sheet stacker 50 through the communication section 210. In short, in this example, the controller 200 controls the entire image forming system 1.

The memory 250 is a volatile memory such as a RAM or a large-capacity nonvolatile memory. The memory 250 stores the program to be executed by the controller 200 or the like and is used as a working area for the controller 200. The memory 250 also stores the sheet S shrinkage information calculated by the arithmetic processor 201 which will be described later. Alternatively, the memory 250 may previously store the shrinkage information of the sheet S subjected to the image forming process by the image forming device 20.

The communication section 210 performs transmission and reception of data with the communication section 510 of the sheet stacker 50. The communication section 210 also performs transmission and reception of data with the external device of the image forming system 1.

The image processing section 260 acquires image data from the job information received from outside and performs image processing. The image processing section 260 performs image processing tasks, including shading correction, image density adjustment, and image compression, on the received image data as necessary under the control by the controller 200. Then, the image data processed by the image processing section 260 is sent to the image forming section 270. The image forming section 270 receives the image data processed by the image processing section 260 and forms an image on a sheet S according to the image data.

The operation display panel 240 is a touch panel which includes a display such as a liquid crystal display (LCD) or an organic ELD (Electro Luminescence Display). This operation display panel 240 is an example of the output and input section which displays an instruction menu for the user, information concerning the acquired image data, and the like. The operation display panel 240 includes a plurality of keys and receives the entries of data such as various instructions, characters, and numerals which are made through key operation by the user, and sends an input signal to the controller 200.

The arithmetic processor 201 acquires image data from the image reading section 360 of the image reader 30. Then, the arithmetic processor 201 calculates information on shrinkage such as the amount of shrinkage or the shrinkage ratio of the sheet S from the acquired image data. The arithmetic processor 201 sends the calculated shrinkage information to the controller 200.

The controller 200 calculates an image correction value according to the shrinkage information sent from the arithmetic processor 201 and sends it to the image processing section 260. The image processing section 260 performs image data processing according to the image correction value sent from the controller 200.

Next, the hardware configuration of the image reader 30 will be described.

The image reader 30 includes a controller 300, communication sections 310 and 320, the paper conveyor 330, the image reading section 360, and a memory 350.

The controller 300 has, for example, a CPU (Central Processing Unit). The controller 300 is connected to the communication sections 310 and 320, the paper conveyor 330, the memory 350, and the image reading section 360 through the system bus to control the entire image reader 30.

The memory 350 is a volatile memory such as a RAM or a large-capacity nonvolatile memory. The memory 350 stores the program to be executed by the controller 300 or the like and is used as a working area for the controller 300.

The communication section 310 performs transmission and reception of data with a communication section 220 of the image forming device 20. The communication section 310 sends the image reading result information read by the image reading section 360 to the communication section 220 of the image forming device 20. Furthermore, the communication section 310 receives the image judgement result from the image forming device 20 through the communication section 220. Also, the communication section 320 performs transmission and reception of data with the communication section 510 of the sheet stacker 50.

Next, the hardware configuration of the sheet stacker 50 will be described.

The sheet stacker 50 includes a controller 500, communication sections 510 and 520, the paper conveyor 530, a memory 550, the stacking section 560, the post-processing section 570, the delivery tray 580, and the sub tray 590.

The controller 500 has, for example, a CPU (Central Processing Unit). The controller 500 is connected to the communication section 510, the paper conveyor 530, the memory 250, the stacking section 560, the post-processing section 570, the delivery tray 580, and the sub tray 590 through the system bus to control the entire sheet stacker 50.

The memory 550 is a volatile memory such as a RAM or a large-capacity nonvolatile memory. The memory 550 stores the program to be executed by the controller 500 or the like and is used as a working area for the controller 500.

The communication section 510 performs transmission and reception of data with the image forming device 20 and the image reader 30. The communication section 520 also performs transmission and reception of data with a device connected downstream of the sheet stacker 50 in the transportation direction, for example, a post-processing device.

The post-processing section 570 performs prescribed post-processing for the printed sheets stacked in the stacking section 560 according to an instruction from the controller 500. The paper conveyor 530 transports the sheet S to the stacking section 560 or the sub tray 590 according to the instruction from the controller 500.

1-3 The Amount of Shrinkage of Sheet S in Each Device

Next, the amount of shrinkage of sheet S as caused by the image forming device 20 and the external device 70 will be described referring to FIGS. 3A and 3B and 4A to 4C.

Figure 3A:
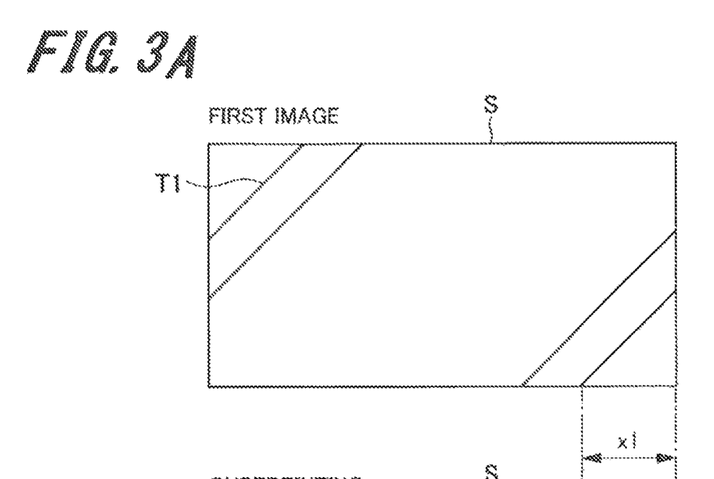
Figure 3B:
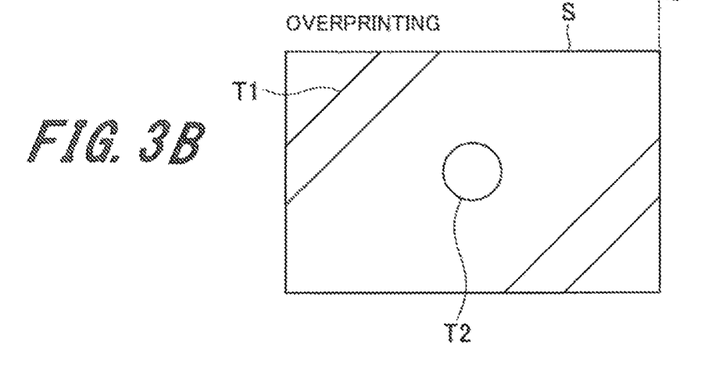

FIGS. 3A and 3B show the amount of shrinkage of sheet S in the case that the second image forming process is performed on the sheet S without the treatment process U1 by the external device 70, in which FIG. 3A shows the sheet S on which an unprocessed image T1 has been formed and FIG. 3B shows the sheet S on which an overprinted image T2 has been formed.

As the sheet S passes through the fixing section 280 of the image forming device 20, it is heated by the fixing section 280. Accordingly, the moisture contained in the sheet S evaporates and the sheet S shrinks. As shown in FIGS. 3A and 3B, the sheet S on which the overprinted image T2 has been formed, namely the overprinted sheet S, shrinks as compared with the sheet S at the time when the unprocessed image T1 has been formed. At this time, the amount of shrinkage of the sheet S is expressed by x1.

Figure 4A:
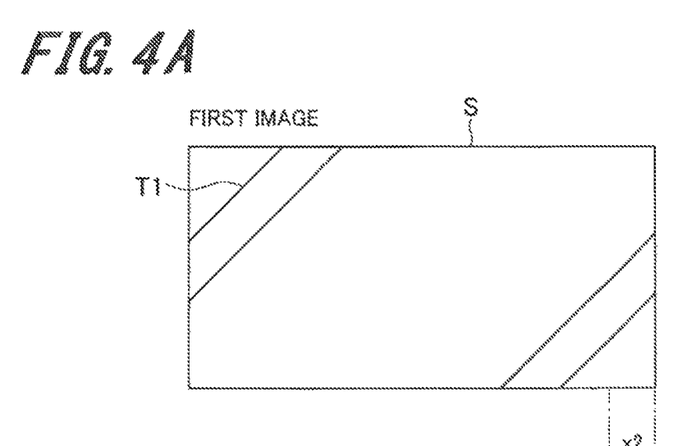
Figure 4B:
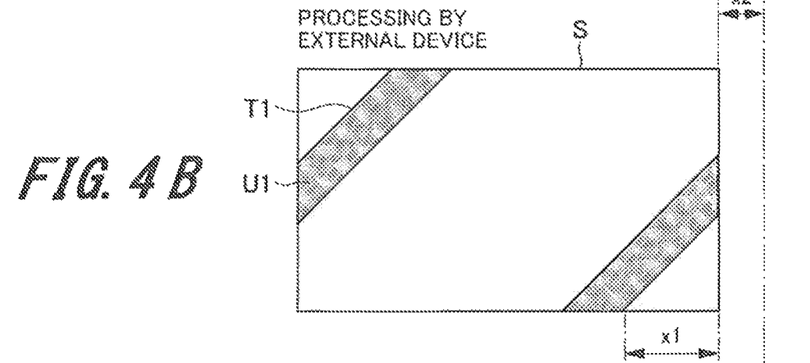
Figure 4C:
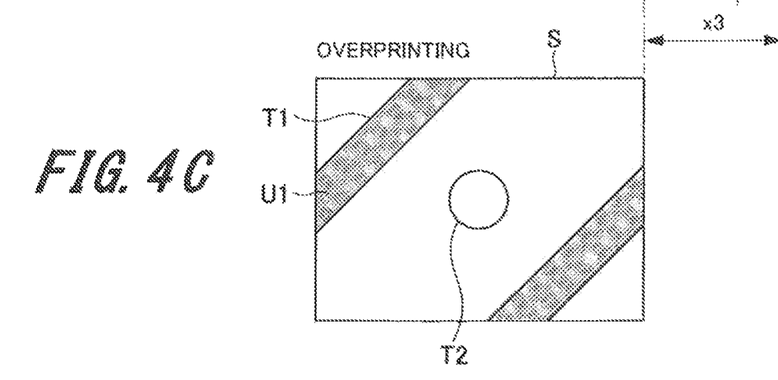

FIGS. 4A to 4C show the amount of shrinkage of the sheet S in the case that the sheet is subjected to the treatment process U1 by the external device 70. FIG. 4A shows the sheet S on which the unprocessed image T1 has been formed, FIG. 4B shows the sheet S subjected to the treatment process U1, and FIG. 4C shows the sheet S on which the overprinted image T2 has been formed.

The sheet S also shrinks due to the treatment process U1 by the external device 70. As shown in FIG. 4B, the sheet S subjected to the treatment process U1 by the external device 70 shrinks by the amount of shrinkage x2 as compared with the sheet S at the time when the unprocessed image T1 has been formed as shown in FIG. 4A. Also, as shown in FIG. 4C, the sheet S on which the treatment process U1 has been performed by the external device 70 and the second image T2 has been formed by the image forming device 20 shrinks by the amount of shrinkage x3 as compared with the sheet S at the time when the unprocessed image T1 has been formed as shown in FIG. 4A.

The sheet S on which the overprinted image T2 has been formed as shown in FIG. 4C shrinks by the amount of shrinkage x1 as compared with the sheet S at the time when it has been subjected to the treatment process U1 as shown in FIG. 4B. The amount of shrinkage x1 is almost equal to the amount of shrinkage x1 caused by the image forming device 20 as shown in FIGS. 3A and 3B. Therefore, the amount of shrinkage caused by the external device 70 (hereinafter referred to as the "amount of external shrinkage") x2 can be calculated from the amount of shrinkage x3 calculated from the sheet S as shown in FIGS. 4A and 4C and the amount of shrinkage caused by the image forming device 20 (hereinafter referred to as the "amount of main shrinkage") x1 (x2=x3−x1).

1-4 Example of Operation of the Image Forming System

Next, an example of operation of the image forming system 1 configured as mentioned above will be described referring to FIGS. 5 to 8.

Figure 5:
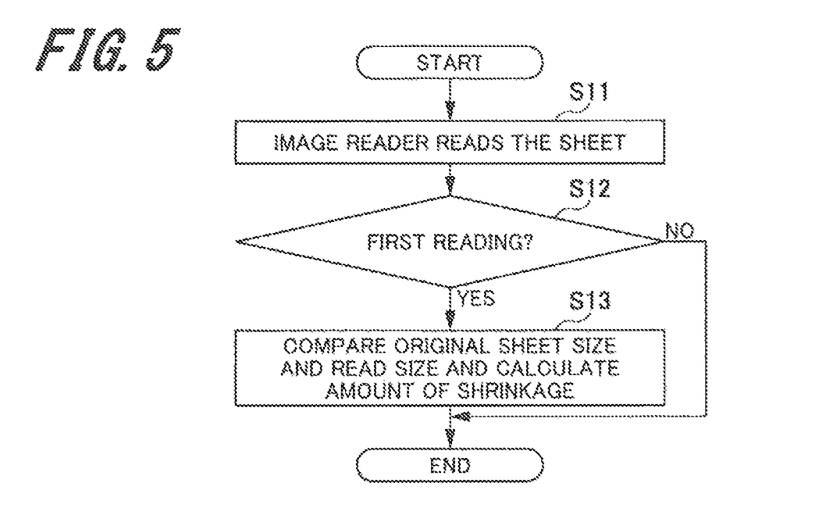
FIG. 5 is a flowchart which shows an example of the sequence of calculating the amount of shrinkage of the sheet as caused by the image forming device in the image forming system according to the first embodiment of the present invention.

First, how the amount of main shrinkage x1 is calculated will be explained referring to FIG. 5, FIGS. 7A to 7C, and FIGS. 8A to 8C. FIG. 5 is a flowchart which shows the sequence of calculating the amount of main shrinkage x1.

Figure 7A:
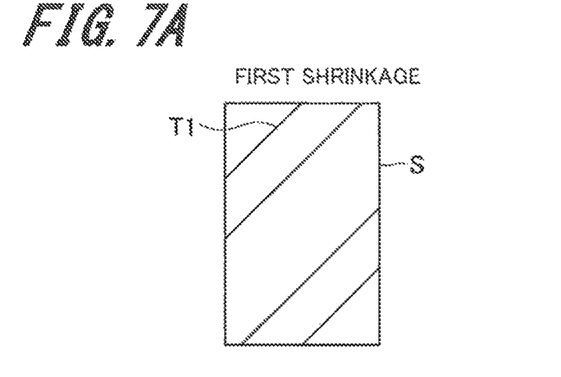
Figure 7B:
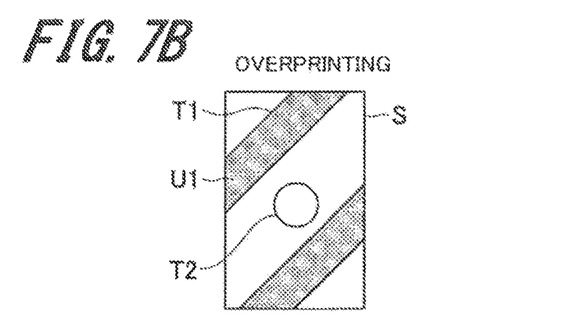
Figure 7C:
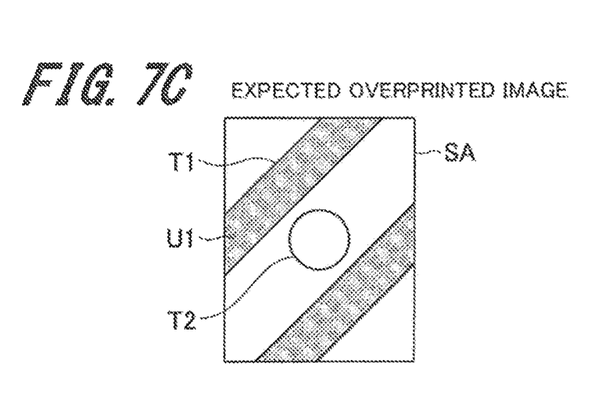
Figure 8A:
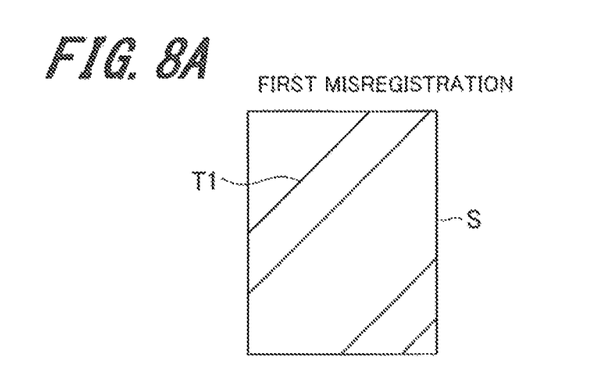
Figure 8B:
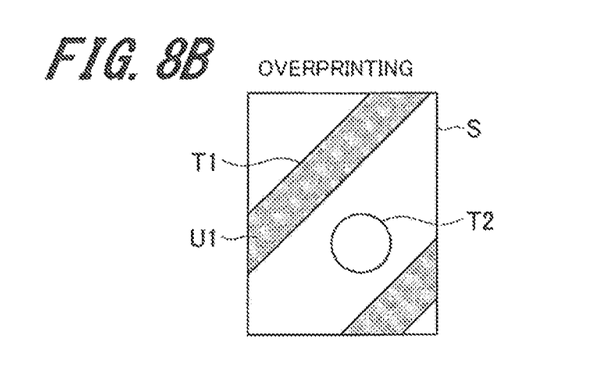
Figure 8C:
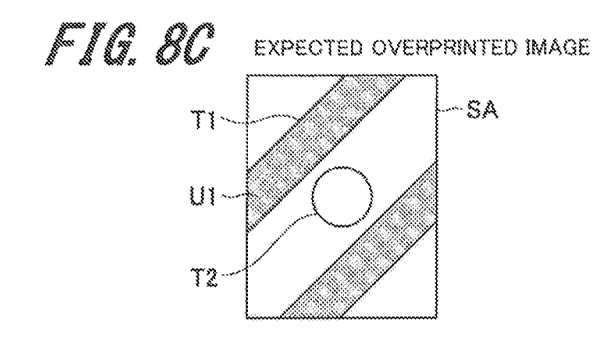

FIGS. 7A to 7C and FIGS. 8A to 8C are explanatory diagrams which show the comparison between the sheet S on which image formation has been performed and the master image. FIGS. 7A to 7C show the comparison between the shrunken sheet S and the master image SA and FIGS. 8A to 8C show the comparison between the sheet S with misregistration and the master image SA. FIG. 7A and FIG. 8A show the sheet S at the time when the unprocessed image T1 has been formed and FIG. 7B and FIG. 8B show the sheet S at the time when it has been processed by the external device 70 and the second image T2 has been formed. FIG. 7C and FIG. 8C show the image data SA of the master image As shown in FIG. 5, the image reading section 360 of the image reader 30 reads the image formed on the sheet S (Step S11). The image reader 30 sends the image data read by the image reading section 360 to the image forming device 20 through the communication section 310.

Next, the controller 200 of the image forming device 20 determines whether the image reading process performed at Step S11 is the first reading process, namely the process of reading the sheet S with the unprocessed image T1 formed thereon, or not (Step S12). If it is determined at Step S12 that the image reading process is not the first reading process (determination at Step S12: NO), the controller 200 of the image forming device 20 ends the sequence.

On the other hand, if it is determined at Step S12 that the image reading process is the first reading process (determination at Step S12: YES), the arithmetic processor 201 of the image forming device 20 compares the original size of the sheet S and the read size and calculates the amount of main shrinkage $x1$ (Step S13). Specifically, the arithmetic processor 201 compares the image data of the sheet with the unprocessed image T1 formed thereon as shown in FIG. 7A and the image data of the master image SA as shown in FIG. 7C which has been previously stored in the memory 250 and calculates the amount of main shrinkage $x1$. This concludes the sequence of calculating the amount of main shrinkage $x1$.

When calculating the amount of main shrinkage $x1$ at Step S13, the arithmetic processor 201 compares the image data of the unprocessed image T1 and the image data of the master image SA and also calculates the amount of image misregistration which has occurred when the unprocessed image T1 has been formed. Consequently, as shown in FIGS. 8A and 8C, even if the position of the unprocessed image T1 deviates from the master image SA, the correct image correction value can be calculated in the process of calculating the image correction value which will be described later.

Then, the arithmetic processor 201 sends the shrinkage information concerning the calculated amount of main shrinkage $x1$ and the misregistration information concerning the amount of misregistration to the controller 200. The controller 200 stores the shrinkage information and misregistration information acquired from the arithmetic processor 201 in the memory 250.

Next, how the amount of external shrinkage $x2$ and the image correction value are calculated will be described referring to FIG. 6.

Figure 6:
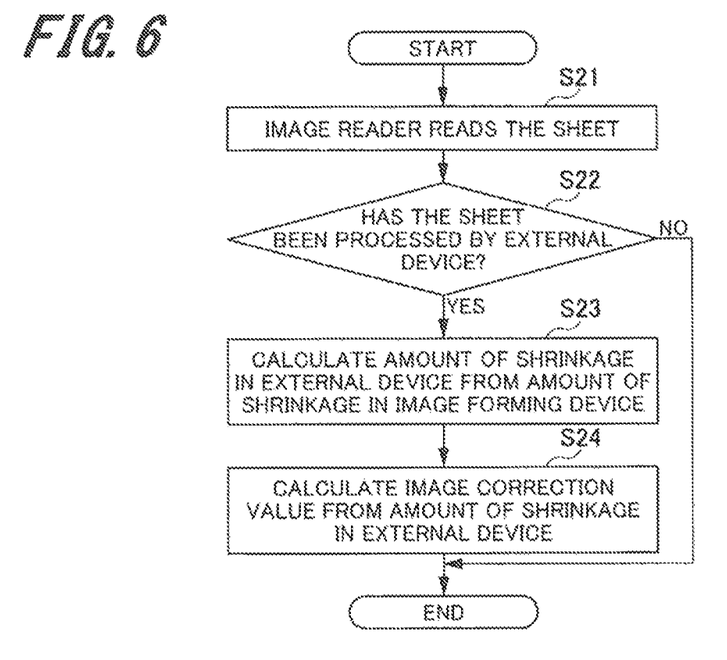
FIG. 6 is a flowchart which shows an example of the sequence of calculating an image correction value in the image forming system according to the first embodiment of the present invention.

FIG. 6 is a flowchart which shows the sequence of calculating the amount of external shrinkage $x2$ and the image correction value.

As shown in FIG. 6, the image reading section 360 of the image reader 30 reads the image formed on the sheet S (Step S21). Then, the image reader 30 sends the image data read by the image reading section 360 to the image forming device 20 through the communication section 320. Then, the controller 200 of the image forming device 20 determines whether the currently transported sheet S has been processed by the external device 70 or not, according the acquired image data (Step S22).

If at Step S22 the controller 200 determines that the transported sheet S has not been processed by the external device 70 (determination at Step S22: NO), the controller 200 ends the sequence. On the other hand, if at Step S22 the controller 200 determines that the transported sheet S has been processed by the external device 70 (determination at Step S22: YES), the controller 200 calculates the amount of external shrinkage $x2$ (Step S23).

At Step S23, the arithmetic processor 201 calculates the amount of external shrinkage $x2$ from the amount of main shrinkage $x1$ as calculated through the sequence shown in FIG. 5. Specifically, the arithmetic processor 201 calculates the amount of shrinkage $x3$ (see FIGS. 4B and 4C) from the size of the sheet S with the unprocessed image T1 formed thereon and the size of the sheet S processed by the external device 70 according to the image data. Then, the arithmetic processor 201 calculates the amount of external shrinkage $x2$ by subtracting the amount of main shrinkage $x1$ calculated through the sequence shown in FIG. 5 from the calculated amount of shrinkage $x3$.

Then, the arithmetic processor 201 sends the calculated amount of external shrinkage $x2$ to the controller 200. Then, the controller 200 calculates the image correction value for formation of the overprinted image T2 according to the amount of external shrinkage $x2$ (Step S24). This concludes the sequence of calculating the image correction value. In the process of calculating the image correction value at Step S24, the controller 200 calculates the image correction value, taking into consideration not only the amount of external shrinkage $x2$ but also the misregistration information. This concludes the sequence of calculating the image correction value in the image forming system 1. Thus, by calculating the image correction value in consideration of the amount of external shrinkage $x2$ caused by the external device 70, image misregistration can be prevented when the overprinted image T2 is formed, namely when overprinting is made.

The controller 200 stores the amount of external shrinkage $x2$ acquired from the arithmetic processor 201 in the memory 250.

The image correction value calculated at Step S24 is applied to the process of forming the overprinted image T2 on the sheet S transported after the calculation of the image correction value as shown in FIG. 6. In other words, the image forming device 20 performs the image forming process according to the image correction value calculated at Step S24 when forming the overprinted image T2 after the treatment process U1 by the external device 70. Consequently, the overprinted image T2 can be formed in a correct position as shown in FIG. 7B. The sheet S used to calculate the image correction value as shown in FIG. 6 is treated as a test sheet.

The memory 250 stores the amount of external shrinkage $x2$ calculated at Step S23 in the memory 250 so that when the next image forming job which uses the external device 70 is performed, it is unnecessary to carry out Step S23 to calculate the amount of external shrinkage $x2$. As a result, the adequate image correction value can be calculated by reading the amount of external shrinkage $x2$ from the memory 250.

Furthermore, if an external process different from the process by the external device 70 is performed for the sheet S in addition to the treatment process by the external device 70, the controller 200 can calculate the amount of shrinkage caused by the different external process from the amount of external shrinkage $x2$ and the amount of main shrinkage $x1$ which are stored in the memory 250.

If a plurality of external processes are performed, the controller 200 may calculate the amount of shrinkage for each of the external processes and store it in the memory 250.

2. Second Embodiment

Next, the image forming system according to a second embodiment will be described referring to FIGS. 9 and 10.

Figure 9:
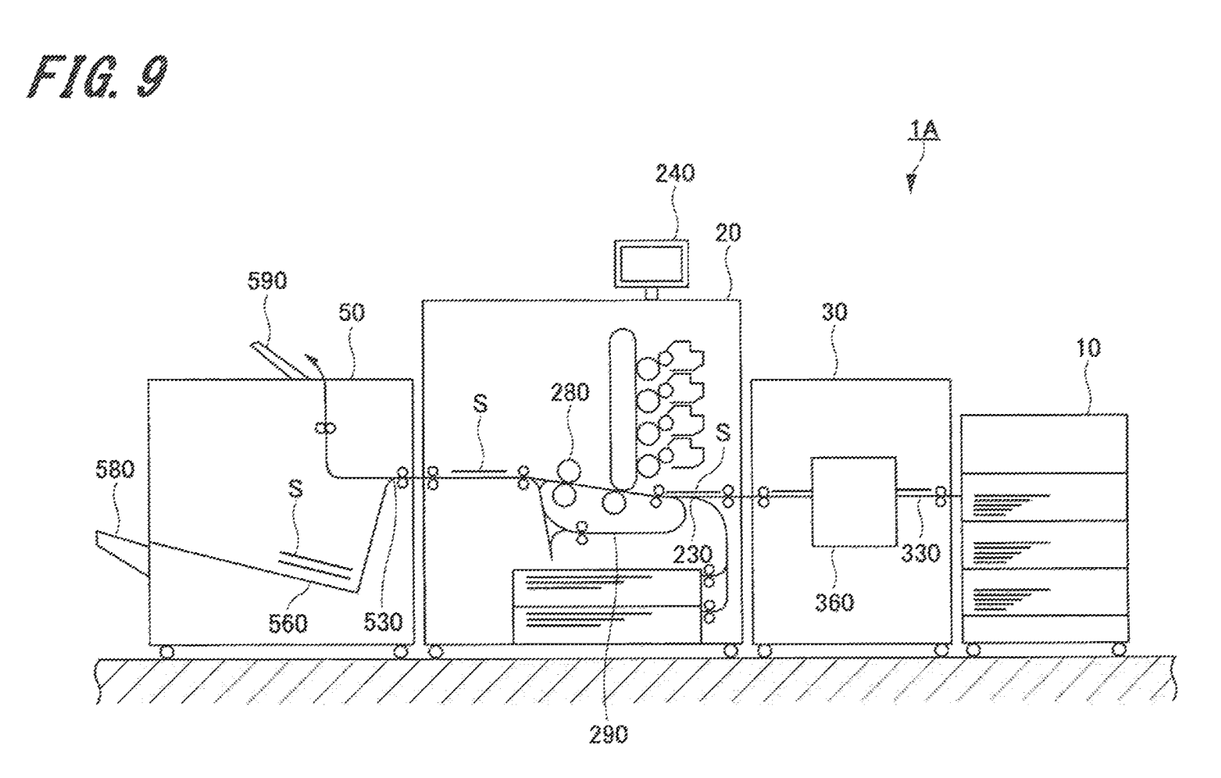
FIG. 9 is a schematic diagram which shows the configuration of the image forming system according to a second embodiment of the present invention.

FIG. 9 is a schematic configuration diagram of an image forming system 1A according to the second embodiment.

The image forming system 1A according to the second embodiment as shown in FIG. 9 includes a large-capacity paper feed unit 10, an image forming device 20, an image reader 30, and a sheet stacker 50. In the image forming system 1A, the large-capacity paper feed unit 10, the image reader 30, the image forming device 20, and the sheet stacker 50 are arranged in the order of mention from upstream of the transportation path for sheets S and connected in series.

The sheet S on which the unprocessed image T1 has been formed by the image forming system 1A is transported to an external device 70 and the external device 70 performs a prescribed treatment process. The sheet S processed by the external device 70 is again transported to the image forming system 1A and then a second image processing process, so-called overprinting, is performed by the image forming system 1A. As a result, the overprinted image T2 is formed on the sheet S.

In the image forming system 1A, the image reader 30 is located upstream of the image forming device 20 in the sheet S transportation direction. Therefore, in the image forming system 1A, the image formed on the sheet S is read by the image reader 30 before the image forming process is performed by the image forming device 20.

The other elements are the same as in the image forming system 1 according to the first embodiment and their description is omitted.

Next, an example of the sequence of calculating the image correction value in the image forming system 1A according to the second embodiment will be described referring to FIG. 10.

Figure 10:
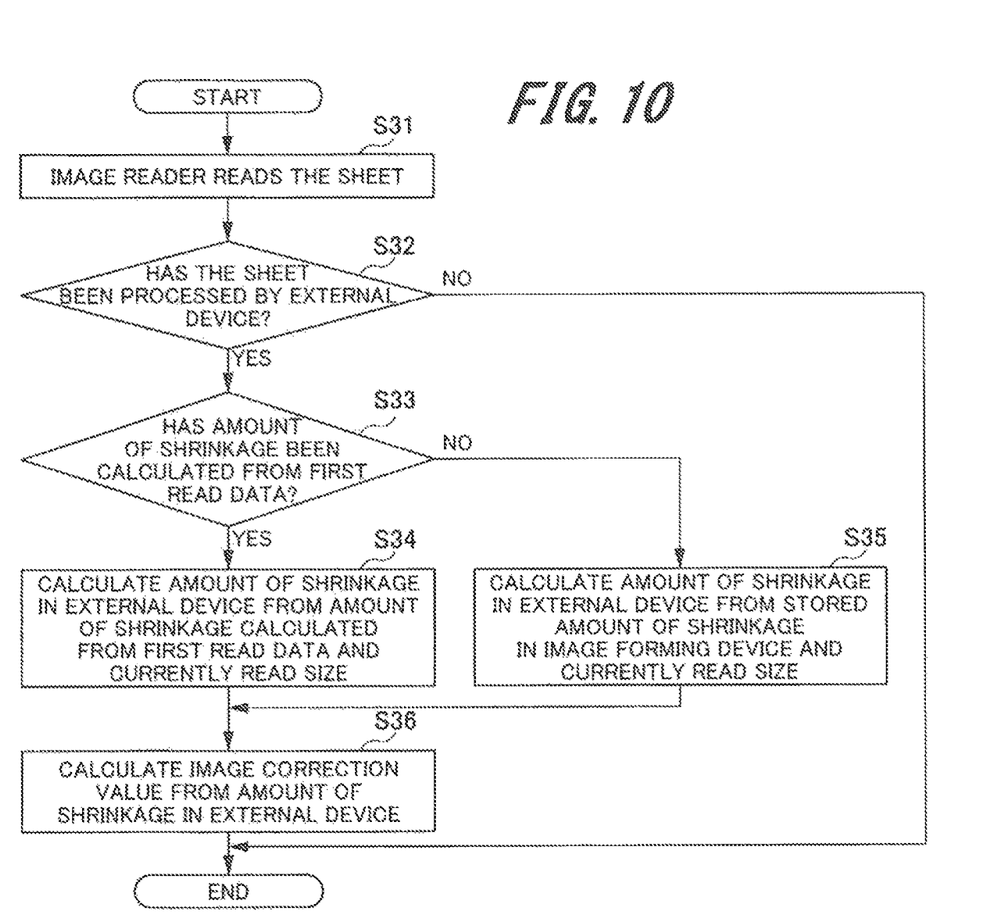
FIG. 10 is a flowchart which shows an example of the sequence of calculating an image correction value in the image forming system according to the second embodiment of the present invention.

FIG. 10 is a flowchart which shows an example of the sequence of calculating the image correction value in the image forming system 1A according to the second embodiment.

As shown in FIG. 10, the image reading section 360 of the image reader 30 reads the image formed on the sheet S (Step S31). Then, the image reader 30 sends the image data read by the image reading section 360 to the image forming device 20 through the communication section 320. Then, the controller 200 of the image forming device 20 determines whether the currently transported sheet S has been processed by the external device 70 or not, according to the acquired image data (Step S32).

If at Step S32 the controller 200 determines that the transported sheet S has not been processed by the external device 70 (determination at Step S32: NO), the controller 200 ends the sequence.

On the other hand, if at Step 23 the controller 200 determines that the transported sheet S has been processed by the external device 70 (determination at Step S32: YES), the controller 200 determines whether the amount of main shrinkage x1 has already been calculated from the data read from the sheet S on which the unprocessed image T1 has been formed (Step S33).

If at Step S33 the controller 200 determines that the amount of main shrinkage x1 has already been calculated from the first read data (determination at Step S33: YES), the arithmetic processor 201 calculates the amount of external shrinkage x2 from the amount of main shrinkage x1 calculated from the first read data and the currently read size of the sheet S (Step S34). Then, the arithmetic processor 201 sends the calculated amount of external shrinkage x2 caused by the external device 70 to the controller 200.

Then, the controller 200 calculates the image correction value for formation of the overprinted image T2 according to the amount of external shrinkage x2 caused by the external device 70 (Step S36). This concludes the sequence of calculating the image correction value.

On the other hand, if at Step S33 the controller 200 determines that the amount of main shrinkage x1 has not been calculated from the first read data (determination at Step S33: NO), the controller 200 acquires the amount of main shrinkage x1 previously stored in the memory 250 and sends it to the arithmetic processor 201. Then, the arithmetic processor 201 calculates the amount of external shrinkage x2 from the amount of main shrinkage x1 and the currently read size of the sheet S (Step S35).

Then, the arithmetic processor 201 sends the calculated amount of external shrinkage x2 to the controller 200. Then, the controller 200 calculates the image correction value for formation of the overprinted image T2 according to the amount of external shrinkage x2 (Step S36). This concludes the sequence of calculating the image correction value.

According to the image forming system 1A according to the second embodiment, since the image reader 30 is located upstream of the image forming device 20, the amount of external shrinkage x2 caused by the external device 70 can be calculated before formation of the overprinted image T2 (overprinting). Therefore, the image correction value calculated at Step S36 can be immediately applied to the sheet S transported for calculation of the image correction value. As a result, the sheet S which is used to calculate the image correction value can be used not as a test sheet but as a non-defective product.

If it is determined at Step S33 that the amount of main shrinkage x1 has already been calculated from the first read data, the value of the amount of main shrinkage x1 stored in the memory 250 may be updated to the amount of main shrinkage x1 calculated from the first read data.

The devices which constitute the image forming system and the order in which the devices are arranged are not limited to those of the image forming system 1 according to the first embodiment and the image forming system 1A according to the second embodiment. For example, the image reader 30 for reading an image may be located on each of the upstream side and downstream side of the image forming device 20. As devices which constitute the image forming system, at least the image forming device 20 for forming an image and the image reader 30 for reading an image should be provided.

So far, the preferred embodiments and their advantageous effects have been described. However, the present invention is not limited to the above embodiments. The invention may be embodied in other various ways without departing from the gist of the present invention as described in the appended claims Although in the above embodiments, four image forming units are used to form a color image, an image forming device according to the present invention may use one image forming unit to form a monochrome image.

In the image forming system 1 according to the first embodiment and the image forming system 1A according to the second embodiment, the controller 200 may check the result of the treatment process U1 by the external device 70 according to the image data read by the image reading section 360. Then, the controller 200 may cause the result of the treatment process by the external device 70 to be reflected in the image correction value to be calculated. The result of the treatment process by the external device 70 includes, for example, the coating amount of lame or varnish, peeling of the lame or vanish coating or the position of the treatment process U1.

As described above, the treatment process U1 is performed on the unprocessed image T1. For this reason, the arithmetic processor 201 may calculate the amount of toner applied to the sheet S from the image data of the unprocessed image T1 read by the image reading section 360 and sends it to the controller 200. Then, the controller 200 may calculate the coating amount of lame or varnish (coating information) to be applied by the external device 70, according to the amount of toner as received from the arithmetic processor 201, and add the coating information to the shrinkage information and misregistration information to calculate the image correction value.

In the abovementioned examples of operation, the arithmetic processor 201 calculates the amount of shrinkage as shrinkage information, but the invention is limited thereto. Instead, the arithmetic processor 201 may calculate the ratio of shrinkage with respect to the original sheet size, namely shrinkage ratio as shrinkage information.

Furthermore, if the image reading section 360 can read both the image on the front side of the sheet S and the image on the back side, the controller 200 may calculate the image correction value for each of the front side and the back side.

Furthermore, the controller 200 may count the number of times of passage of the sheet S through the image forming device 20 in each job and store the number of times of passage in the memory 250. Then, the controller 200 may calculate the image correction value in consideration of the number of times of passage.

Furthermore, the image forming system 1 or 1A may include a determination section which determines the paper type of the sheet S. The determination section sends the information on the determined paper type of the sheet S to the controller 200 and the arithmetic processor 201. The arithmetic processor 201 calculates the amount of main shrinkage depending on the paper type. Thus, the arithmetic processor 201 can also calculate the amount of external shrinkage depending on the paper type according to the amount of main shrinkage depending on the paper type. As a result, the controller 200 can calculate the image correction value depending on the paper type.

Furthermore, the image forming system 1 or 1A may include a measuring section which measures the environmental temperature and humidity. The measuring section sends the information on the environmental measurements to the controller 200 and the arithmetic processor 201. The arithmetic processor 201 calculates the amount of main shrinkage depending on the environmental information and sends it to the controller 200. As a result, the controller 200 can calculate the image correction value depending on the environmental information.

As the sheet S passes through the image forming device 20, the moisture in the sheet S evaporates and shrinks, but as time elapses, the sheet S again absorbs moisture and expands. Therefore, an elapsed time measuring section may be provided to measure, for each job, the time period from when the first image processing process is performed on the sheet S, through the treatment process U1 by the external device 70, until the sheet S is again made to pass through the image forming device 20. The controller 200 may calculate the image correction value in consideration of the elapsed time measured by the elapsed time measuring section.

Furthermore, in the above embodiments, it is assumed that the arithmetic processor 201 of the image forming device 20 is used as the arithmetic processor to calculate information on the shrinkage of the sheet S, but the present invention is not limited thereto. For example, instead, the controller 300 of the image reader 30 for reading an image may be used as the arithmetic processor to calculate information on the shrinkage.

The above elements, functions, processing sections and so on may be, in part or in whole, implemented by hardware such as integrated circuitry. Also, the above elements, functions and so on may be implemented by software so that a processor interprets and executes the program to perform the functions. The information such as programs, tables, and files to perform the functions may be stored in a recording device such as a memory, a hard disk, or an SSD (Solid State Drive) or in a recording medium such as an IC card, an SD card, or a DVD.

Although embodiments of the present invention have been described and illustrated in detail, the disclosed embodiments are made for purposes of illustration and example only and not limitation. The scope of the present invention should be interpreted by terms of the appended claims

REFERENCE SIGNS LIST 1, 1A . . . image forming system,
10 . . . large-capacity paper feed unit,
20 . . . image forming device,
30 . . . image reader,
50 . . . sheet stacker,
70 . . . external device,
200 . . . controller,
201 . . . arithmetic processor,
210, 220 . . . communication section,
240 . . . operation display panel,
250 . . . memory (storage),
260 . . . image processing section,
270 . . . image forming section,
280 . . . fixing section,
360 . . . image reading section,
T1 . . . unprocessed image,
T2 . . . overprinted image,
U1 . . . treatment process,
x1 . . . amount of main shrinkage,
x2 . . . amount of external shrinkage,
x3 . . . amount of shrinkage

What is claimed is:

1. An image forming system comprising:
an image forming device which forms an image on a sheet;
an image reader which reads the image formed on the sheet;
an arithmetic processor which calculates information on shrinkage which occurs in the sheet when the sheet is subjected to a treatment process by an external device installed separately from the image forming device, according to image data read by the image reader, as external shrinkage information; and
a controller which calculates an image correction value according to the external shrinkage information calculated by the arithmetic processor, wherein
the image forming device forms an overprinted image according to the image correction value when forming the overprinted image on the sheet subjected to the treatment process.

2. The image forming system according to claim 1, wherein the arithmetic processor calculates the external shrinkage information according to information on main shrinkage which occurs in the sheet when the sheet passes through the image forming device.

3. The image forming system according to claim 2, further comprising a storage which stores the main shrinkage information.

4. The image forming system according to claim 2, wherein
the image reader reads an unprocessed image formed on the sheet by the image forming device before the treatment process is performed, and
the arithmetic processor calculates the main shrinkage information from the image data of the unprocessed image read by the image reader.

5. The image forming system according to claim 1, wherein the image reader is located downstream of the image forming device in a direction of transportation of the sheet.

6. The image forming system according to claim 1, wherein the image reader is located upstream of the image forming device in a direction of transportation of the sheet.

7. The image forming system according to claim 1, wherein the controller counts a number of times of passage of the sheet through the image forming device and calculates the image correction value depending on the counted number of times of passage of the sheet.

8. The image forming system according to claim 1, wherein
the arithmetic processor calculates the external shrinkage information depending on the paper type which is determined by the image forming system.

9. The image forming system according to claim 1, wherein
the controller calculates the image correction value depending on the environmental information measured by the image forming system.

10. The image forming system according to claim 1, further comprising:
an elapsed time measuring section which measures a time period from when the image is formed on the sheet by the image forming device until the sheet is again made to pass through the image forming device, wherein
the controller calculates the image correction value depending on the time period measured by the elapsed time measuring section.

11. The image forming system according to claim 1, wherein the controller checks a result of processing by the external device according to the image data read by the image reader.

12. An image forming system control method which uses a non-transitory computer-readable recording medium storing a program causing a computer to perform:
causing an image forming device to form an image on a sheet;
causing an image reader to read the image formed on the sheet;
causing an arithmetic processor to calculate information on shrinkage which occurs in the sheet when the sheet is subjected to a treatment process by an external device installed separately from the image forming device, according to read image data, as external shrinkage information; and
causing a controller to calculate an image correction value according to the external shrinkage information, wherein
the image forming device forms an overprinted image according to the image correction value when forming the overprinted image on the sheet subjected to the treatment process.

13. A non-transitory computer-readable recording medium storing a program causing a computer to perform:
causing an image forming device to form an image on a sheet;
causing an image reader to read the image formed on the sheet;
causing an arithmetic processor to calculate information on shrinkage which occurs in the sheet when the sheet is subjected to a treatment process by an external device installed separately from the image forming device, according to image data read by the image reader, as external shrinkage information;
causing a controller to calculate an image correction value according to the external shrinkage information calculated by the arithmetic processor; and
causing the image forming device to form an overprinted image according to the image correction value when forming the overprinted image on the sheet subjected to the treatment process.

* * * * *